United States Patent
Schwandt et al.

(10) Patent No.: US 10,305,245 B2
(45) Date of Patent: May 28, 2019

(54) IMPEDANCE MATCHING IN A GAS-LASER EXCITATION ARRANGEMENT

(71) Applicant: TRUMPF Laser- und Systemtechnik GmbH, Ditzingen (DE)

(72) Inventors: Markus Schwandt, Korntal-Muenchingen (DE); Gerold Mahr, Korntal-Muenchingen (DE); Stefan Knupfer, Hoefingen (DE); Sergej Friesen, Ditzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 15/415,019

(22) Filed: Jan. 25, 2017

(65) Prior Publication Data

US 2017/0133817 A1    May 11, 2017

Related U.S. Application Data

(63) Continuation of application No. PCT/EP2015/067390, filed on Jul. 29, 2015.

(30) Foreign Application Priority Data

Aug. 1, 2014   (DE) .................. 10 2014 215 226

(51) Int. Cl.
  *H01S 3/097*   (2006.01)
  *H01S 3/0971*  (2006.01)
  *H01S 3/038*   (2006.01)

(52) U.S. Cl.
  CPC ........ *H01S 3/09702* (2013.01); *H01S 3/0385* (2013.01); *H01S 3/0971* (2013.01)

(58) Field of Classification Search
  CPC ... H01S 3/0385; H01S 3/0971; H01S 3/09702
  See application file for complete search history.

(56) References Cited

U.S. PATENT DOCUMENTS 4,035,748 A   7/1977   Kusaka et al.
4,035,758 A   7/1977   Panke
(Continued)

FOREIGN PATENT DOCUMENTS

DE    4200622 A1    7/1992
DE    4329550 A1    3/1995
(Continued)

OTHER PUBLICATIONS

International Search Report for corresponding PCT Application No. PCT/EP2015/067390, dated Oct. 14, 2015, 4 pages.

*Primary Examiner* — Xinning(Tom) Niu
(74) *Attorney, Agent, or Firm* — Fish & Richardson P.C.

(57) ABSTRACT

An impedance matching circuit for a gas-laser excitation system includes a high-frequency connection line configured to be connected at a first connection point to a power source and at a second connection point to a gas-laser electrode. The impedance matching circuit is characterized in that an impedance of at least one section of the high-frequency connection line changes by a change to a configuration of the high-frequency connection line, in particular to at least one parameter of the high-frequency connection line in the at least one section.

19 Claims, 3 Drawing Sheets

(56) References Cited

U.S. PATENT DOCUMENTS

| | | | |
|---|---|---|---|
| 4,039,971 A * | 8/1977 | Wang | H01S 3/095 372/38.03 |
| 4,631,732 A * | 12/1986 | Christensen | H01S 3/0315 372/64 |
| 4,730,333 A * | 3/1988 | Butenuth | H01S 3/03 372/35 |
| 7,605,673 B2 | 10/2009 | Robotham et al. | |
| 2006/0039440 A1 | 2/2006 | Schwandt | |
| 2010/0316084 A1 | 12/2010 | Hauer et al. | |
| 2012/0106586 A1 | 5/2012 | Villarreal-Saucedo et al. | |
| 2015/0270678 A1 | 9/2015 | Schwandt et al. | |

FOREIGN PATENT DOCUMENTS

| | | |
|---|---|---|
| DE | 10015699 A1 | 10/2001 |
| DE | 102004039082 A1 | 2/2006 |
| DE | 102012222469 A1 | 6/2014 |
| EP | 0243592 A2 | 11/1987 |
| EP | 0309826 A1 | 4/1989 |
| EP | 0525823 A1 | 2/1993 |
| WO | 0173940 A2 | 10/2001 |
| WO | WO2008118342 A1 | 10/2008 |
| WO | WO2013148530 A2 | 10/2013 |

\* cited by examiner

IMPEDANCE MATCHING IN A GAS-LASER EXCITATION ARRANGEMENT

CROSS-REFERENCE TO RELATED APPLICATIONS

This application is a continuation of and claims priority under 35 U.S.C. § 120 to PCT Application No. PCT/EP2015/067390 filed on Jul. 29, 2015, which claims priority to German Application No. 10 2014 215 226.7, filed on Aug. 1, 2014. The entire contents of these priority applications are incorporated herein by reference.

TECHNICAL FIELD

The invention relates to impedance matching in a gas laser excitation arrangement.

BACKGROUND

High-power lasers having a light power of no less than 500 W can be used in laser processing, for example for marking metals or non-metals, for cutting, welding and processing materials, e.g., metals.

In order to excite a gas laser, gas discharge is generally generated. The gas discharge is generally generated by supplying electrical power, in particular often by means of high-frequency (HF) electrical power. The electrical power is generally supplied by means of electrodes. The high-frequency power is often coupled in at one or more supply points on the electrode. The electrodes are commonly arranged in pairs, one of the electrodes commonly being at a static potential, in particular at earth potential. An electrical power source, e.g., a HF power source, is connected to the other electrode. A source and a load are connected to a high-frequency connecting line. The power source has an output impedance. The load has a load impedance. To improve the energy transfer from the source to the load, the load impedance has to be matched to the source impedance. This is commonly achieved by means of an additional impedance matching circuit connected between the load and the power source.

SUMMARY

One aspect of the present invention features an impedance matching arrangement (or circuit) for a gas laser excitation arrangement (assembly or system). The impedance matching arrangement comprises a high-frequency connecting line which can be connected to a power source at a first connection point and to a gas laser electrode at a second connection point, the impedance of the high-frequency connecting line changing at least in one portion as a result of the design, in particular a parameter, of the high-frequency connecting line changing in this portion. According to the invention, the impedance is therefore matched by a part of the high-frequency connecting line itself. As a result, additional components can be eliminated. Simplified impedance matching can be achieved in the gas laser excitation arrangement.

At a given geometric length, e.g., the prescribed length of a laser or laser electrode, the impedance can be matched over a comparatively wide range. It has been shown that even the frequency range in which impedance can be matched can be extended in this manner. Therefore, the high-frequency power can be used with a plurality of frequency components.

The impedance can continuously change in the portion. In particular, the parameter of the high-frequency connecting line, for example the width of the high-frequency connecting line, can therefore continuously change in the portion. As a result, the electrical length or the transformation effect can be optimized with respect to the geometric length.

The design of the portion can change by the shape, in particular the geometry or the cross section, of the high-frequency connecting line continuously changing in the at least one portion.

The high-frequency connecting line can be designed to electromagnetically interact with the gas laser excitation arrangement in the portion. In this way, part of the gas laser excitation arrangement can also be used for impedance matching.

The high-frequency connecting line can be designed as a coaxial cable comprising an inner conductor and an outer conductor, the cross section, in particular the magnitude or the area of the cross section, of the inner conductor and/or the outer conductor changing steadily in the portion.

The inner conductor and/or the outer conductor can comprise portions of different constant cross sections, the cross section steadily changing at the transition from one cross section to the next cross section. The impendence matching can be adjusted by the cross section changing. The cross section can be changed in particular by the diameter or the width of the high-frequency connecting line changing in the portion.

In this case, the diameter or the width of the high-frequency connecting line can change steadily in the portion. In particular, the high-frequency connecting line can be stepless in the portion. This results in a particularly broadband impedance matching.

The high-frequency connecting line can be designed as a conductor path arrangement comprising a conductor path and a reference surface, the width of the conductor path changing, in particular steadily, in the portion. In this case, the conductor path can comprise a plurality of portions of different widths, the width steadily changing from one width to the next width. Impedance transformation can occur each time the width changes.

The high-frequency connecting line can be designed as a conductor path arrangement comprising a conductor path and a reference surface, the distance from the conductor path to the reference surface changing, in particular steadily, in the portion. As a result of the distance changing, the interaction between the high-frequency connecting line and the reference surface also changes. This can also lead to impedance matching.

Alternatively or additionally, the high-frequency connecting line can be designed as a conductor path arrangement comprising a conductor path and a reference surface, the dielectric constant of the dielectric between the conductor path and the reference surface changing, in particular steadily, in the portion. Changing the distance to the reference surface and/or changing the dielectric constant, in particular by using different dielectrics, allows impedance to be matched in a particularly simple technical manner.

The high-frequency connecting line can have a predefined impedance at the first connection point that can be adjusted by means of the capacitive and/or inductive coupling between the high-frequency connecting line and a shield. This ensures that the impedance at the second connection point is precisely matched to the load.

Another aspect of the present invention features a gas laser excitation arrangement comprising an impedance matching arrangement, the high-frequency connecting line extending at least in one portion at a defined distance to, in particular in parallel with, a gas laser electrode. This results in a particularly space-saving arrangement of the high-frequency connecting line.

This gas electrode can be, at least in part, part of the impedance matching arrangement. When this is the case, the impedance matching arrangement has a particularly compact design.

Alternatively or additionally, the gas electrode can be, at least in part, part of the high-frequency connecting line.

A gas laser electrode can be connected to earth.

The defined distance between the portion and the gas laser electrode can be determined in different ways. In particular, the defined distance may be no higher than 10 cm, in particular no higher than 5 cm, in particular no higher than 1 cm. Alternatively, the defined distance may be no more than $\frac{1}{5}$, in particular no more than $\frac{1}{10}$, of the wavelength of the high-frequency for which the impedance matching arrangement is designed.

In another alternative, the defined distance may be no more than half, in particular no more than $\frac{1}{5}$, in particular no more than $\frac{1}{10}$, of the length of the high-frequency connecting line in the portion.

Furthermore, the defined distance may be such that a high-frequency electric field is created between the high-frequency connecting line and the gas laser electrode when high-frequency power is conducted from the first connection point to the second connection point. In this case, a high-frequency electric field is not created or only a small high-frequency electric field is created outside of the portion.

The high-frequency connecting line can have a predefined impedance at the first connection point, which can be adjusted in the portion by the distance and the area between the high-frequency connecting line and the gas laser electrode. It is thus also possible to adjust the impedance matching.

The high-frequency connecting line can be surrounded by the gas discharge in the portion. Alternatively, the high-frequency connecting line can surround the gas discharge in the portion.

According to an embodiment which is particularly advantageous in terms of size, the high-frequency connecting line can be arranged at least in part in the inner electrode of a coaxial laser.

The gas laser electrode can be designed as a planar electrode. The high-frequency connecting line can comprise an outer conductor that forms part of the gas laser electrode.

The reference surface of the impedance matching arrangement can be, at least in part, part of the gas laser excitation arrangement, it being possible for said reference surface to be in particular connected to an electrode.

Further features and advantages of the invention can be found in the following description of an embodiment of the invention, by way of the drawings, which show details essential to the invention, and from the claims. The individual features may each be implemented in isolation or together in any desired combination in a variant of the invention.

A preferred embodiment of the invention is shown schematically in the drawings and is described in greater detail in the following with reference to the drawings.

DETAILED DESCRIPTION

Figure 1:
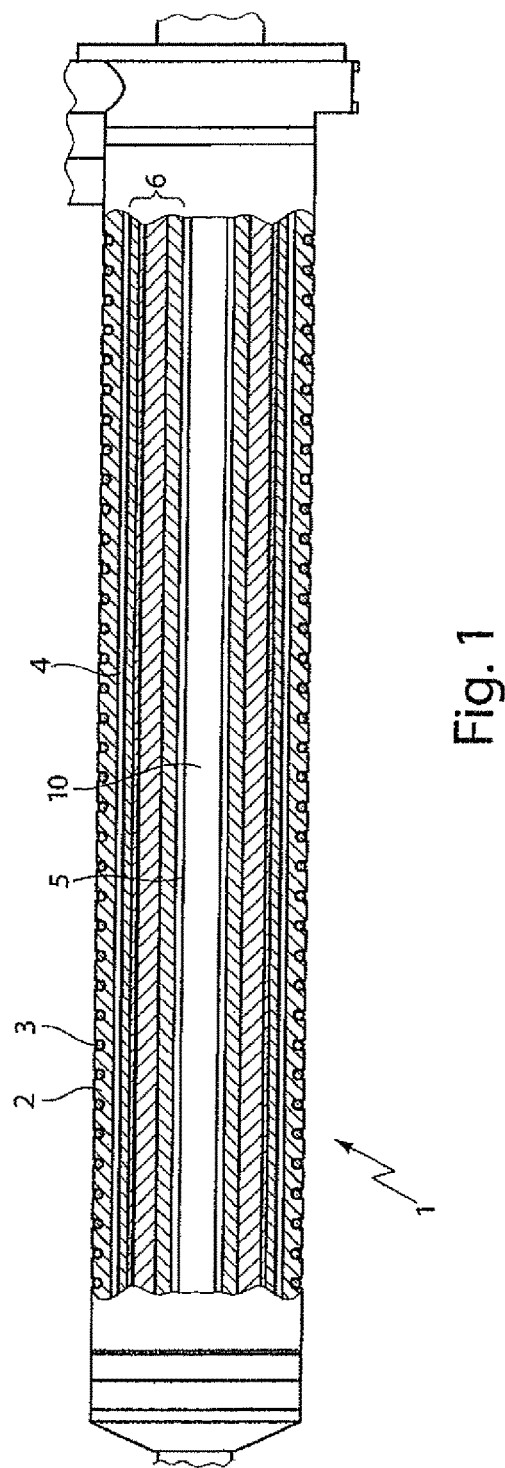
FIG. 1 is a partial sectional view of a diffusion-cooled gas laser excitation arrangement.

FIG. 1 is a partial sectional view of a diffusion-cooled gas laser excitation arrangement 1. The gas laser excitation arrangement 1 comprises an outer electrode 2 in which cooling pipes 3 for a coolant, e.g., cooling liquid, are arranged. The outer electrode 2 is made of metal and is connected to earth. The discharge gap 4 is directly below the electrode 2. The second electrode is denoted by reference numeral 5.

A dielectric 6 is located above the second electrode 5 and can be constructed from a plurality of different layers of material. In the embodiment shown, power is supplied centrally, based on the length of the electrode 5, at a location (or a supply point) 10.

Figure 2:
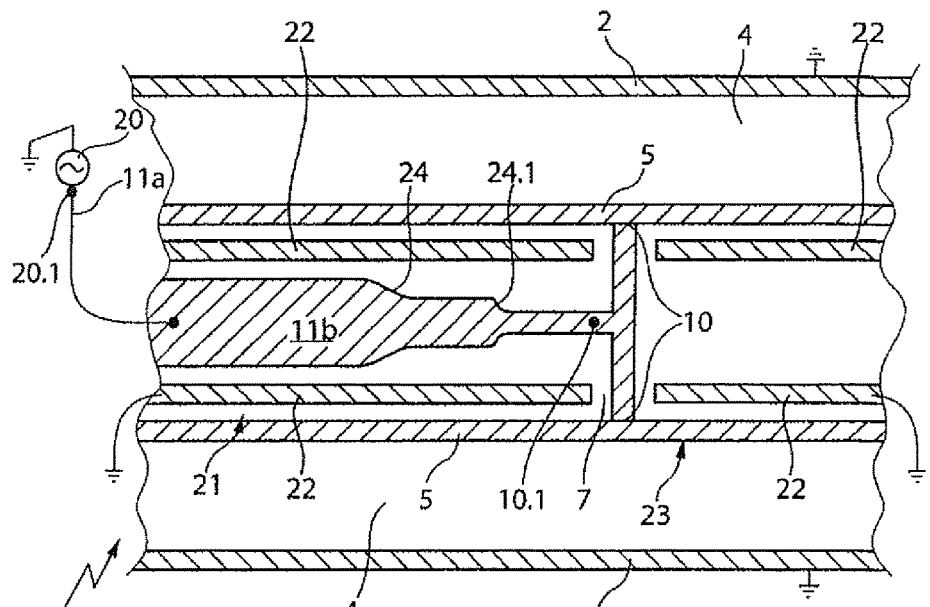
FIG. 2 is an enlarged view of the gas laser excitation arrangement of FIG. 1 in the region of a supply point.

It can be seen in the enlarged view of FIG. 2 that the discharge gap 4 is between the electrode 2 and the electrode 5. In this case, the electrodes 2 and 5 are arranged coaxially with one another. A high-frequency connecting line 11a, 11b is connected to a power source 20, which generates high-frequency power, at a first connection point 20.1 and to an electrode 5 at a second connection point 10.1. The high-frequency connecting line extends in the portion 11b thereof inside the electrode 5 and substantially in parallel with the extension direction thereof. A shield 22 is provided in a first region 21 between the connecting line 11b and the electrode 5. The shield 22 comprises, in the region of the supply point 10, a recess 7 through which the high-frequency connecting line 11b is guided to the electrode 5. The shield 22 is also provided in a second region 23. However, there is no high-frequency connecting line in this region 23. The shield 22 is connected to earth just like the electrode 2. In the embodiment shown, the electrode 2, the shield 22 and the portion 11b of the high-frequency connecting line extend substantially in parallel with one another. The shield 22 extends in parallel with the electrode 5 in the second region 23 too.

The diameter of the part of the high-frequency connecting line 11b that extends coaxially with the electrode 5 and the shield 22 becomes smaller at two locations approaching the supply point 10. However, the transition from one diameter to another diameter is steady, as can be seen at the locations 24a, 24b. The change in diameter corresponds to a change in the design of the high-frequency connecting line in the part 11b of the high-frequency connecting line. The impedance changes as a result of the diameter changing.

Figure 3:
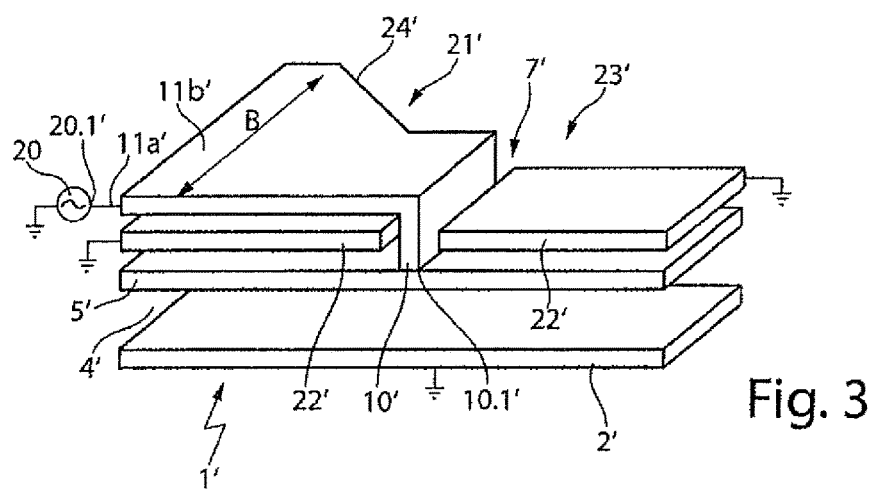
FIG. 3 is a schematic view illustrating an example of a gas laser excitation arrangement in the form of a slab laser.

FIG. 3 show a gas laser excitation arrangement 1' in the form of a slab laser. A discharge gap 4' is located between an electrode 2', which is connected to earth, and an electrode 5'. The electrode 5' is connected at connection point 10.1' to the power source 20 at connection point 20.1' via a high-frequency connecting line 11a, 11b'. In a first region 21', a shield 22', which is connected to earth, is provided between the portion 11b' of the high-frequency connecting line and the electrode 5'. On the right-hand side of the supply point 10', it is only the shield 22' that is provided and not a high-frequency connecting line. Therefore, only the shield 22' and part of the electrode 5' are provided in the region 23'. The shield 22' comprises a recess 7' through which the electrode 5' can be contacted. It can be seen that the width B of the high-frequency connecting line 11b' becomes smaller approaching the supply point 10' at the connection point 10.1'. The transition between the widths is steady, as can be seen at the location 24'. This results in impedance matching. The change in width corresponds to a change in the design of the high-frequency connecting line in the part 11b of the high-frequency connecting line.

Figure 4:
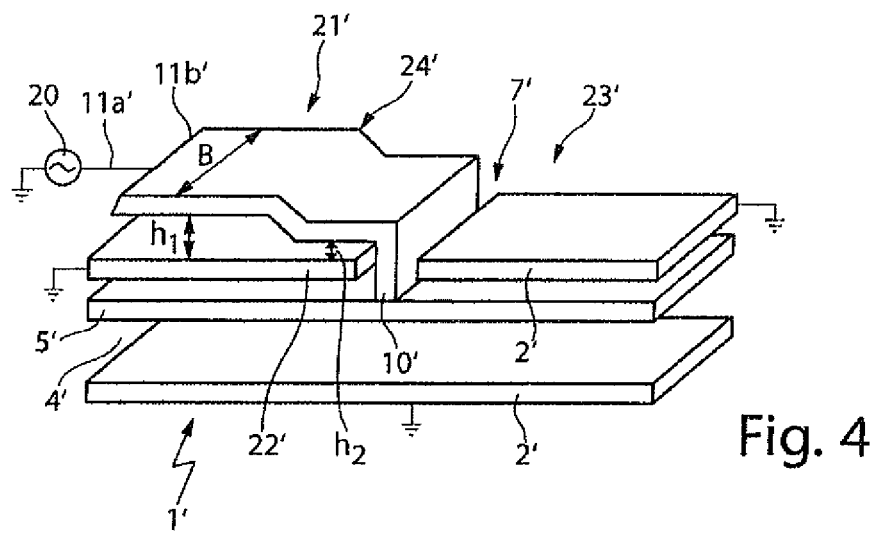
FIG. 4 is a schematic view illustrating another example of a gas laser excitation arrangement in the form of a slab laser.

FIG. 4 shows another embodiment of the invention, the high-frequency connecting line having, in this case, a constant width B in the region 11b', but having different heights h1, h2 to the shield 22', which can be referred to as reference surfaces. In region 24', the height h1 has changed into height h2 in a steady manner. There is no step-like transition. Even by the distance from h1 to h2 changing, the design of the high-frequency connecting line 11b' also changes and thus results in impedance matching.

Figure 5:
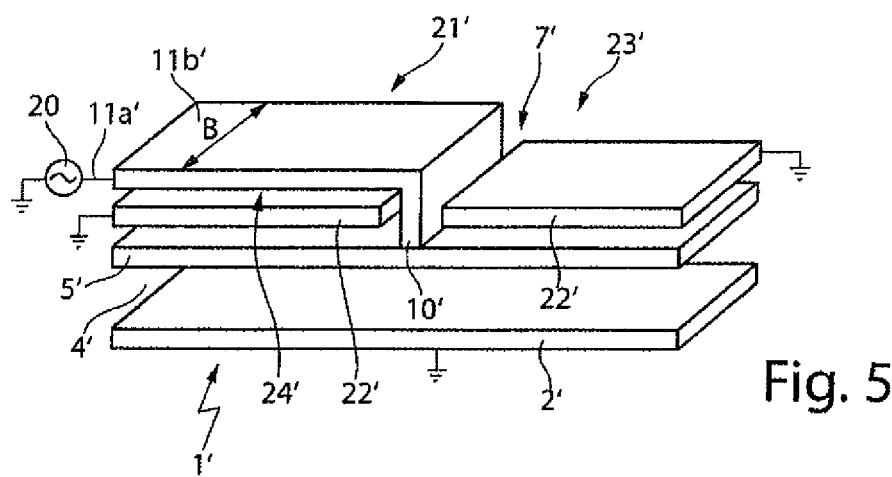
FIG. 5 is a schematic view illustrating a further example of a gas laser excitation arrangement in the form of a slab laser.

In another embodiment according to FIG. 5, the high-frequency connecting line 11b' has in turn a constant width. However, the dielectric between the high-frequency connecting line 11b' and the shield 22', which also acts as a reference surface, is not constant. In particular, the dielectric continuously changes in a region 24'; but this cannot be shown graphically. This also results in impedance matching. The different options for impedance matching from FIGS. 3 to 5 can also be combined with one another in any desired combination.

A number of embodiments of the invention have been described. Nevertheless, it will be understood that various modifications may be made without departing from the spirit and scope of the invention. Accordingly, other embodiments are within the scope of the following claims.

What is claimed is:

1. A gas laser excitation system comprising an impedance matching circuit, the system comprising:
   a gas laser electrode; and
   a high-frequency connecting line configured to be connected to a power source at a first connection point and to the gas laser electrode at a second connection point, wherein the high-frequency connecting line is configured such that an impedance of at least one portion of the high-frequency connecting line changes continuously as a result of at least one parameter of the high-frequency connecting line changing in the at least one portion.

2. A gas laser excitation system comprising an impedance matching circuit, the system comprising:
   a gas laser electrode; and
   a high-frequency connecting line configured to be connected to a power source at a first connection point and to the gas laser electrode at a second connection point, wherein the high-frequency connecting line is configured such that an impedance of at least one portion of the high-frequency connecting line changes as a result of at least one parameter of the high-frequency connecting line changing in the at least one portion, and
   wherein the parameter includes a shape of the high-frequency connecting line, and the shape continuously changes in the at least one portion.

3. The gas laser excitation system of claim 2, wherein the shape includes at least one of a geometry or a cross section.

4. A gas laser excitation system comprising an impedance matching circuit, the system comprising:
   a gas laser electrode; and
   a high-frequency connecting line configured to be connected to a power source at a first connection point and to the gas laser electrode at a second connection point, wherein the high-frequency connecting line is configured such that an impedance of at least one portion of the high-frequency connecting line changes as a result of at least one parameter of the high-frequency connecting line changing in the at least one portion, and
   wherein the high-frequency connecting line is configured to electromagnetically interact with the gas laser excitation system in the at least one portion.

5. A gas laser excitation system comprising an impedance matching circuit, the system comprising:
   a gas laser electrode; and
   a high-frequency connecting line configured to be connected to a power source at a first connection point and to the gas laser electrode at a second connection point, wherein the high-frequency connecting line is configured such that an impedance of at least one portion of the high-frequency connecting line changes as a result of at least one parameter of the high-frequency connecting line changing in the at least one portion,
   wherein the high-frequency connecting line is configured to be a coaxial cable comprising an inner conductor and an outer conductor, and
      wherein at least one of the inner conductor or the outer conductor comprises portions of different constant cross sections, the cross sections changing steadily at a transition from a first cross section to a second cross section.

6. A gas laser excitation system comprising an impedance matching circuit, the system comprising:
   a gas laser electrode; and
   a high-frequency connecting line configured to be connected to a power source at a first connection point and to the gas laser electrode at a second connection point, wherein the high-frequency connecting line is configured such that an impedance of at least one portion of the high-frequency connecting line changes as a result of at least one parameter of the high-frequency connecting line changing in the at least one portion,
   wherein the high-frequency connecting line is configured to be a conductor path arrangement including a conductor path,
      wherein the parameter includes a width of the conductor path that changes in the at least one portion, and
      wherein the conductor path comprises a plurality of portions of different widths, the width steadily changing from a first width to a second width.

7. A gas laser excitation system comprising an impedance matching circuit, the system comprising:
   a gas laser electrode; and
   a high-frequency connecting line configured to be connected to a power source at a first connection point and to the gas laser electrode at a second connection point, wherein the high-frequency connecting line is configured such that an impedance of at least one portion of the high-frequency connecting line changes as a result of at least one parameter of the high-frequency connecting line changing in the at least one portion, and
   wherein the high-frequency connecting line is configured to be a conductor path arrangement including a conductor path and a reference surface.

8. The gas laser excitation system of claim 7, wherein the parameter includes a distance from the conductor path to the reference surface, and wherein the distance changes in the at least one portion such that an interaction between the high-frequency connecting line and the reference surface changes.

9. The gas laser excitation system of claim 7, wherein the parameter includes a dielectric constant of at least one dielectric between the conductor path and the reference surface, the dielectric constant changing in the at least one portion.

10. A gas laser excitation system comprising an impedance matching circuit, the system comprising:
a gas laser electrode; and
a high-frequency connecting line configured to be connected to a power source at a first connection point and to the gas laser electrode at a second connection point,
wherein the high-frequency connecting line is configured such that an impedance of at least one portion of the high-frequency connecting line changes as a result of at least one parameter of the high-frequency connecting line changing in the at least one portion,
wherein the high-frequency connecting line has a predefined impedance at the first connection point, and
wherein the predefined impedance is adjustable by at least one of capacitive coupling or inductive coupling between the high-frequency connecting line and a shield arranged between the high-frequency connecting line and the gas laser electrode.

11. The gas laser excitation system of claim 1, wherein the at least one portion of the high-frequency connecting line is in parallel with the gas laser electrode.

12. The gas excitation system of claim 1, wherein the impedance matching circuit includes at least part of the high-frequency connecting line and at least part of the gas laser electrode.

13. The gas laser excitation system of claim 1, wherein at least part of the gas laser electrode is part of the high-frequency connecting line.

14. The gas laser excitation system of claim 1, wherein the high-frequency connecting line extends in the at least one portion at a defined distance to the gas laser electrode.

15. The gas laser excitation system of claim 14, wherein the defined distance is no more than a percentage of a length of the at least one portion of the high-frequency connecting line, and wherein the percentage is 50%, 20%, or 10%.

16. A gas laser excitation system comprising an impedance matching circuit, the system comprising:
a gas laser electrode; and
a high-frequency connecting line configured to be connected to a power source at a first connection point and to the gas laser electrode at a second connection point,
wherein the high-frequency connecting line is configured such that an impedance of at least one portion of the high-frequency connecting line changes as a result of at least one parameter of the high-frequency connecting line changing in the at least one portion,
wherein the high-frequency connecting line extends in the at least one portion at a defined distance to the gas laser electrode,
wherein the high-frequency connecting line has a predefined impedance at the first connection point, and
wherein the predefined impedance is adjustable by the defined distance and an area between the high-frequency connecting line and the gas laser electrode in the at least one portion.

17. The gas laser excitation system of claim 14, wherein the defined distance is determined such that a high-frequency electric field is created between the high-frequency connecting line and the gas laser electrode when the high-frequency power is conducted from the first connection point to the second connection point.

18. The gas laser excitation system of claim 1, wherein the high-frequency connecting line includes an outer conductor configured to form part of the gas laser electrode.

19. A gas laser excitation system comprising an impedance matching circuit, the system comprising:
a gas laser electrode; and
a high-frequency connecting line configured to be connected to a power source at a first connection point and to the gas laser electrode at a second connection point,
wherein the high-frequency connecting line is configured such that an impedance of at least one portion of the high-frequency connecting line changes as a result of at least one parameter of the high-frequency connecting line changing in the at least one portion, and
wherein the high-frequency connecting line is configured to be arranged at least in part in an inner electrode of a coaxial laser.

* * * * *